United States Patent
Slutsky

(10) Patent No.: US 10,013,744 B2
(45) Date of Patent: Jul. 3, 2018

(54) METHOD AND SYSTEM FOR CORRECTING IMAGE DISTORTION

(71) Applicant: Inuitive Ltd., RaAnana (IL)

(72) Inventor: Michael Slutsky, Kfar-Saba (IL)

(73) Assignee: Inuitive Ltd., RaAnana (IL)

( * ) Notice: Subject to any disclaimer, the term of this patent is extended or adjusted under 35 U.S.C. 154(b) by 118 days.

(21) Appl. No.: 14/911,274

(22) PCT Filed: Aug. 26, 2014

(86) PCT No.: PCT/IL2014/050762
§ 371 (c)(1),
(2) Date: Feb. 10, 2016

(87) PCT Pub. No.: WO2015/029024
PCT Pub. Date: Mar. 5, 2015

(65) Prior Publication Data
US 2016/0189352 A1    Jun. 30, 2016

Related U.S. Application Data

(60) Provisional application No. 61/869,792, filed on Aug. 26, 2013.

(51) Int. Cl.
*G06K 9/00* (2006.01)
*G06T 5/00* (2006.01)
*H04N 5/345* (2011.01)

(52) U.S. Cl.
CPC ............. *G06T 5/006* (2013.01); *H04N 5/345* (2013.01)

(58) Field of Classification Search
CPC ....... G06T 5/006; G06T 3/0093; H04N 5/345; H04N 3/233; H04N 3/2335; G02B 27/0025
See application file for complete search history.

(56) References Cited

U.S. PATENT DOCUMENTS

| 5,276,519 | A | 1/1994 | Richards et al. |
| 5,465,121 | A | 11/1995 | Blalock et al. |
| 6,538,691 | B1 * | 3/2003 | Macy ................... H04N 3/2335 348/222.1 |
| 8,120,676 | B2 | 2/2012 | Murata |
| 8,358,835 | B2 | 1/2013 | Song et al. |

(Continued)

FOREIGN PATENT DOCUMENTS

| EP | 1650705 | 4/2006 |
| WO | WO 2010/071647 | 6/2010 |

(Continued)

OTHER PUBLICATIONS

International Preliminary Report on Patentability dated Mar. 10, 2016 From the International Bureau of WIPO Re. Application No. PCT/IL2014/050762.

(Continued)

*Primary Examiner* — Yon Couso

(57) ABSTRACT

An image processing method is disclosed. The method comprises receiving from an imaging sensor input image data arranged in a plurality of pixel data rows corresponding to a grid of sensor pixels, and sampling the input image data to provide sampled image data having less pixel data rows. The method further comprises correcting image distortion in at least a portion of the sampled data.

33 Claims, 3 Drawing Sheets

(56) References Cited

U.S. PATENT DOCUMENTS

| | | |
|---|---|---|
| 8,675,115 B1 | 3/2014 | Gigushinski et al. |
| 2007/0025636 A1 | 2/2007 | Furukawa et al. |
| 2008/0136943 A1 | 6/2008 | Azuma |
| 2009/0067745 A1 | 3/2009 | Cellier |
| 2009/0263018 A1 | 10/2009 | Murakami et al. |
| 2012/0044391 A1* | 2/2012 | Ni .................. H04N 5/3572 348/242 |
| 2012/0057053 A1 | 3/2012 | Mallon et al. |
| 2014/0313316 A1* | 10/2014 | Olsson ............... H04N 7/183 348/84 |

FOREIGN PATENT DOCUMENTS

| | | |
|---|---|---|
| WO | WO 2013/015699 | 1/2013 |
| WO | WO 2015/029024 | 3/2015 |

OTHER PUBLICATIONS

International Search Report and the Written Opinion dated Nov. 27, 2014 From the International Searching Authority Re. Application No. PCT/IL2014/050762.

\* cited by examiner

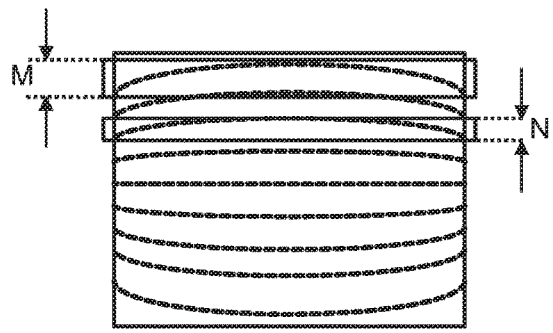
FIG. 3A
FIG. 3B
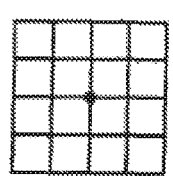 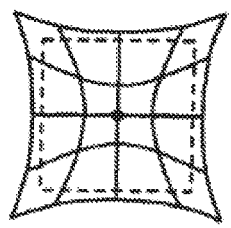 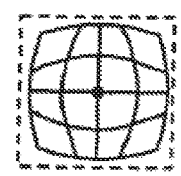
FIG. 4A         FIG. 4B         FIG. 4C

METHOD AND SYSTEM FOR CORRECTING
IMAGE DISTORTION

RELATED APPLICATIONS

This application is a National Phase of PCT Patent Application No. PCT/IL2014/050762 having International filing date of Aug. 26, 2014, which claims the benefit of priority under 35 USC § 119(e) of U.S. Provisional Patent Application No. 61/869,792 filed on Aug. 26, 2013. The contents of the above applications are all incorporated by reference as if fully set forth herein in their entirety.

FIELD AND BACKGROUND OF THE INVENTION

The present invention, in some embodiments thereof, relates to imaging and, more particularly, but not exclusively, to a method and system for correcting image distortion.

Digital cameras are used for still photography and videography and the captured digital images may be transferred to an image display device such as a monitor. Due to imperfections and natural limitations of cameras' optical system, the digital images displayed on a monitor may show geometrical distortions. Geometrical distortions are a class of optical aberrations that occur when the object is not situated on the optical axis of the camera's lens system. Geometrical distortions depend on the angle that a ray incident on the lens makes with the optical axis.

Rapid advancement in high resolution sensors, based on either charged couple device (CCD) or complementary metal oxide semiconductor (CMOS) technology, has made digital still camera and video recorders popular and affordable. The sensor technology follows the long standing semiconductor trend of increasing density and reducing cost at a very rapid pace. However, the cost of digital still camera and the video recorders do not follow the same steep curve. The reason is the optical system used in the image acquisition systems has become the bottleneck both in performance and in cost. A typical variable focus and variable zoom optical system has more than a dozen lenses. While the number of pixel lines and pixel resolution rapidly increase, the precision of optical components fail to keep the pace since the optical technology does not evolve as fast as the semiconductor technology.

Precision optical parts with tight tolerances are expensive to make, and it is difficult to maintain focus, spherical aberration, centering, chromatic aberrations, astigmatism, distortion, and color convergence within a tight tolerance even after very careful assembly process.

In digital imaging, an image can be processed for correcting optical distortion by a data processor. In the field of digital imaging, techniques relating to the correction of optical distortion have conventionally been proposed.

U.S. Pat. No. 5,276,519 discloses a video image capture apparatus for digitally compensating imperfections introduced by an optical system. The apparatus includes an image sensor for sensing light at a plurality of pixel positions received via the optical system, picture storage means for temporarily storing pixels derived from the image sensor, and address generation means for applying differing write and read addresses to the picture storage to effect mapping of input pixels from the image sensor to provide output pixels compensating for the effects of imperfections of the optical system.

U.S. Pat. No. 5,465,121 discloses a system for compensating distortions resulting from a projection of an image source onto a surface that is not perpendicular to an image source projection system. A data processing system image source data file is identified and a test pattern is displayed utilizing a data processing system visual output device. A user is able to enter a distortion compensation factor and the displayed test pattern is modified utilizing the distortion compensation factor. Once a final distortion compensation factor has been selected by the user in response to the appearance of the modified test pattern, the data processing system image source data file is modified utilizing the selected distortion compensation factor.

SUMMARY OF THE INVENTION

According to an aspect of some embodiments of the present invention there is provided a method of processing an image. The method comprises receiving from an imaging sensor input image data arranged in a plurality of pixel data rows corresponding to a grid of sensor pixels; using a digital image processor for sampling the input image data to provide sampled image data having less pixel data rows than the plurality of pixel data rows; using the digital image processor for correcting image distortion in at least a portion of the sampled data to provide processed image data; and transmitting the processed image data to a display and/or a computer readable medium.

According to some embodiments of the invention the image data are sampled such that a resolution along each pixel data row is maintained.

According to some embodiments of the invention the image data are sampled such that a resolution along each pixel data row is reduced.

According to some embodiments of the invention the correction of the image distortion is executed to correct a geometric distortion.

According to some embodiments of the invention the geometric distortion comprises barrel distortion.

According to some embodiments of the invention the correction of the image distortion is executed to correct a chromatic aberration.

According to some embodiments of the invention the correction of the image distortion comprises collectively processing pixel data rows sampled from M consecutive pixel data rows of the input image data and stored in a row buffer having a storage capacity of no more than K pixel data rows.

According to some embodiments of the invention the method comprises sampling the processed image data prior to the transmission.

According to some embodiments of the invention a sampling factor characterizing the sampling of the processed image data is selected responsively to a level of the distortion.

According to some embodiments of the invention the image data correspond to a frame of a video stream, and the method is repeated for each frame of the video stream.

According to an aspect of some embodiments of the present invention there is provided a computer software product. The product comprises a computer-readable medium in which program instructions are stored, which instructions, when read by a computer, cause the computer to receive from an imaging sensor input image data arranged in a plurality of pixel data rows corresponding to a grid of sensor pixels, and to execute the method as described herein.

According to an aspect of some embodiments of the present invention there is provided a system for image processing. The system comprises a digital image processor configured to receive from an imaging sensor input image data arranged in a plurality of pixel data rows corresponding to a grid of sensor pixels, and to sample the input image data to provide sampled image data having less pixel data rows than the plurality of pixel data rows; and a row buffer configured to temporarily store partial image data corresponding to a portion of the less pixel data rows; wherein the digital image processor is configured to receive the partial image data from the buffer and to correct image distortion in the partial image data.

According to some embodiments of the invention the system further comprises the imaging sensor.

According to some embodiments of the invention the processor is configured to sample the image data such that a resolution along each pixel data row is maintained.

According to some embodiments of the invention the processor is configured to correct a geometric distortion in the partial image data. According to some embodiments of the invention the geometric distortion comprises pincushion distortion. According to some embodiments of the invention the geometric distortion comprises barrel distortion.

According to some embodiments of the invention the processor is configured to correct a chromatic aberration in the partial image data. According to some embodiments of the invention the chromatic aberration comprises a longitudinal chromatic aberration. According to some embodiments of the invention the chromatic aberration comprises a lateral chromatic aberration.

According to some embodiments of the invention the processor is configured to sample image data following the correction.

According to some embodiments of the invention a sampling factor characterizing the sampling of the image data following the correction is selected responsively to a level of the distortion.

According to some embodiments of the invention the correction of the image distortion is effected by a metric procedure.

According to some embodiments of the invention the correction of the image distortion is effected by a non-metric procedure.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A-3B are schematic illustrations describing a sampling procedure which can be applied to input image data according to some embodiments of the present invention;

FIGS. 4A-4C are schematic illustrations describing types of geometrical distortions;

DESCRIPTION OF SPECIFIC EMBODIMENTS OF THE INVENTION

Figure 1:
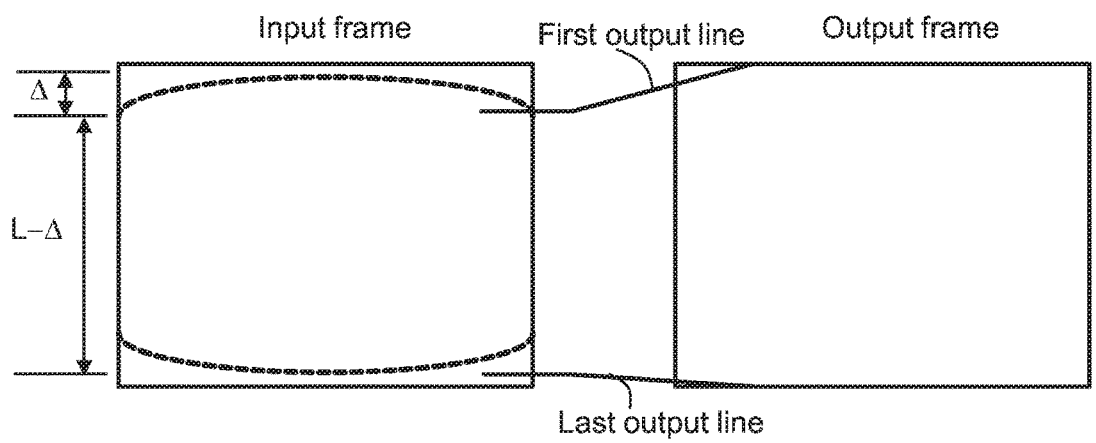
FIG. 1 is a schematic illustration describing a geometrical distortion.

The present invention, in some embodiments thereof, relates to imaging and, more particularly, but not exclusively, to a method and system for correcting image distortion.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Conventional techniques for digital correction of image distortion employ buffer memory in a distortion correcting circuit. The buffer memory requires large capacity, since in geometrical distortions resulting from the optical system, pixel data for a single output line is oftentimes supported by many tens or a few hundreds of input lines. It was found by the present inventor that while such process may be adequate for offline image processing, it significantly affects the performances during streaming of image data.

Conventional techniques typically employ dynamic random access memory (DRAM) to store the intermediate data for processing. The random-access processing does not need the buffer memory. However, it was found by the present inventor that this approach increases the required DRAM volume, which introduces time latency into the processing pipeline, since the transfer time with DRAM becomes generally long.

The present inventor has additionally found that the problem of delay in the correction of image distortion, particularly geometrical distortion caused by the optical system, is not necessarily uniform. This can be better understood with reference to FIG. 1. The number of input lines (pixel rows) in the input frame are denoted by L, and the number of input lines that are processed for providing a first output line in which the geometrical distortion is corrected is denoted by $\Delta$. Typically, $\Delta$ is the maximal extent of the geometrical distortion along the vertical direction, since the first input line is typically the farthest from the optical axis of the image capturing system. The number of lines that are not processed for providing the first output line is $L-\Delta$. Thus, there is a delay of $\Delta$ lines before the first output line is generated. A priori, it is not necessary to process $\Delta$ lines in order to generate the second output line, because some of the input lines that contain the information for generating the second output line have already been processed in order to generate the first output line. Thus, it is not necessary to generate a uniform delay in order to correct geometrical distortion. For example, the last output line, in principle, can be generated without delay.

Some conventional techniques employ an output buffer having the same size as the image, and some conventional techniques increase the ratio between the number of processed line and the number of output lines. However, the former solution requires doubling the memory resources, while the latter solution increases the time latency.

The present Inventor has successfully devised a technique for processing an image, which technique overcomes at least some of the above limitations.

The image to be processed using the technique of the present embodiments is generally in the form of imagery data arranged in a plurality of pixel data rows corresponding to a grid of sensor pixels. Each pixel data row is arranged over a one-dimensional array of pixels. The direction along a row of pixels is referred to herein as the horizontal direction, and the direction in the image plane that is perpendicular to the rows is referred to below as the vertical direction.

The term "pixel" is sometimes abbreviated herein to indicate a picture-element. However, this is not intended to limit the meaning of the term "picture-element" which refers to a unit of the composition of an image.

References to an "image" herein are, inter alia, references to values at pixels treated collectively as an array. Thus, the term "image" as used herein also encompasses a mathematical object which does not necessarily correspond to a physical object. The original and processed images certainly do correspond to physical objects which are the scene from which the imaging data are acquired.

In various exemplary embodiments of the invention the image is a polychromatic image. In these embodiments, each pixel in the image is represented by a color spectrum resolvable into a plurality (e.g., three or more) of individual colors over a grid. The individual colors are typically in the form of digital intensity values sampling the amount of light at a plurality of color channels.

Figure 2:
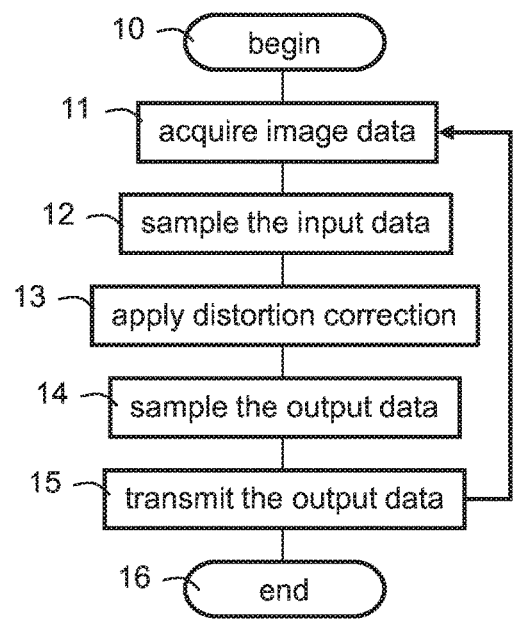
FIG. 2 is a flowchart diagram of a method suitable for processing an image according to various exemplary embodiments of the present invention.

Reference is now made to FIG. 2 which is a flowchart diagram of a method suitable for processing an image according to various exemplary embodiments of the present invention. The method is particularly useful for correcting image distortion, such as, but not limited to, geometrical distortion. The method of the present embodiments can be executed by a data processor, which can be a general purpose computer or dedicated circuitry.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

Computer programs implementing the method according to some embodiments of the present invention can commonly be distributed to users on a distribution medium such as, but not limited to, a flash memory card or a CD-ROM. The computer programs can also be downloaded by the user from the internet, in which case the distribution medium is a hard drive at an accessible remote site. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The method can be embodied in many forms. For example, it can be embodied on a tangible medium such as a computer for performing the method steps. It can be embodied on a computer readable medium, comprising computer readable instructions for carrying out the method steps. In can also be embodied in electronic device having digital computer capabilities arranged to run the computer program on the tangible medium or execute the instruction on a computer readable medium.

The method begins at 10 and optionally and preferably continues to 11 at which an imaging sensor is used for acquiring image data. The image data form an image or a partial image of a scene. The image sensor can be of any type known in the art, including, without limitation, CMOS sensor, a CCD sensor and the like. Typically, the method captures a video stream which may include a plurality of time-dependent values (e.g., grey-levels, intensities, color intensities, etc.), wherein a particular value at a particular time-point corresponds to a picture-element (e.g., a pixel, a sub-pixel or a group of pixels) in a video frame. Alternatively, 11 can be skipped in which case an image data are received from an external source.

The method continues to 12 at which the input image data are sampled to provide sampled image data having less pixel data rows than the number of pixel data rows in the input image. The sampling factor is preferably selected in accordance with the vertical extend of the distortion to be corrected as well as the desired buffering volume as further detailed hereinbelow. Preferably, but not necessarily, there is no down-sampling along the rows, such that the horizontal resolution (along each pixel data row) remains the same as the horizontal resolution in the input image. Embodiments in which horizontal resolution is employed are not excluded from the scope of the present invention.

The method continues to 13 at which a distortion correction procedure is applied to the sample data, to provide corrected image data. This is optionally and preferably done with the aid of a row buffer configured to temporarily store partial image data corresponding to a portion of the pixel data rows of the sampled image. Thus, the row buffer stores several data rows of the sampled image, and the distortion correction procedure is then applied, collectively, to the stored data rows. The stored data rows are sampled from M consecutive pixel data rows of the input image data, where M is preferably at least the vertical extent of the distortion, namely the number of input rows across which information pertaining to a single output row is spanned. In various exemplary embodiments of the invention the row buffer has a storage capacity of no more than K pixel data rows, wherein sampling 12 is executed such that K and M satisfy the constraint $2^{i-1} K < M < 2^i K$, where i is a positive integer. In these embodiments, the row buffer can store $\Delta_i = 2^{1-i} M - K$ rows down-sampled by a factor $2^i$ and $\Delta_{i-1} = 2M - 2^{1-i} K$ rows down-sampled by a factor $2^{i-1}$.

It was found by the present inventors that sampling according to the above constraint provides sufficient distortion correction, in particular at a central region of the image, which typically contains most of the information of interest.

A representative example for the case in which i=1 (K<M<2K) is illustrated in FIGS. 3A and 3B. FIG. 3A schematically illustrates the locations of sample points in the input image for different locations of the output lines. As shown, the distortion along the vertical direction, is generally lower close to the middle of the image along the vertical direction. In various exemplary embodiments of the invention the method employs lower buffered support at the middle of the image than at the extremities. Since the region of interest is typically near or at the central part of the image, the method according to some embodiments of the present invention adaptively reduce the resolution as the vertical distance from the center of the image increases.

FIG. 3B schematically illustrates a down-sampling procedure according to some embodiments of the present invention. The amount of down-sampling optionally and preferably depends on the extent of distortion along the vertical direction. As a simplified representative example, which is not intended to be limiting, down-sampling factor of, say, 1:4, can be applied for rows near the extremities of the image (namely row near the first and last rows). For rows further away from the extremities, but still not close to the vertical center (e.g., rows having a distance of at least L/8 rows but less than L/4 rows from the vertical center of the image), a lower down-sampling factor can be employed, e.g., 1:2 can be employed. For rows near and at the center (e.g., rows having a distance of less than L/8 rows from the vertical center of the image), the method can maintain the resolution of the input image.

Any correction procedure can be used. In various exemplary embodiments of the invention a procedure for correcting geometric distortion is employed. The procedure can correct pincushion distortion and/or barrel distortion.

As used herein, "pincushion distortion" refers to a distortion where the right and left edges, and/or, the top and bottom edges, of the nominally rectangular pixel array experience an inward bending. FIG. 4B illustrates a representative example of a pincushion distortion of a rectangular pixel array that is illustrated in FIG. 4A.

As used herein, "barrel distortion" refers to a distortion where the right and left edges, and/or, the top and bottom edges, of the nominally rectangular pixel array experience an outward bending. FIG. 4B illustrates a representative example of a barrel distortion of the rectangular pixel array that is illustrated in FIG. 4A.

The present embodiments also contemplate a procedure that corrects a combination of pincushion and barrel distortions. For example, the image data can include pincushion distortion near the vertical center of the image and barrel distortion away from the vertical center, and the correction can includes a weighted algorithm that applies higher level of pincushion distortion correction near the vertical center and higher level of barrel distortion correction away from the vertical center.

When geometric distortion is corrected, the procedure for correcting the distortion can be metric or non-metric.

A metric procedure can be used to correct the distortion using intrinsic and/or extrinsic parameters of a camera model that may affect the distortion caused by the lens placed in front of the image sensor. The intrinsic and extrinsic parameters can be measured on the basis of reference points.

A non-metric procedure does not rely on reference points but rather on the fact that straight lines in a scene project to straight lines in an image. When a non-metric procedure is employed, the procedure optionally and preferably corrects distortion by fitting curved lines into straight lines.

Also contemplated are procedures that correct geometric distortions using a lookup table which is responsible for removing distortion from the source image, and which is calculated in a calibration stage, for example, once after a lens change (zoom movement) or once for a fixed lens.

Procedures for correcting geometric distortions suitable for the present embodiments are found, for example, in International Publication No. WO2013015699, U.S. Patent Application Publication No. 20120057053 and U.S. Pat. No. 8,120,676 the contents of which are hereby incorporated by reference.

The present embodiments also contemplate application of a correction procedure that corrects a chromatic aberration.

Chromatic aberration appears when a lens is transmitting polychromatic light. Since the index of refraction of optical glass is wavelength dependent, the red, green and blue components bend differently at an optical interface in the lens. This leads to longitudinal and/or transverse chromatic aberration effects.

In longitudinal chromatic aberration, the three components are brought to focus on different planes in the image space, which gives a color blurring effect. Thus, longitudinal chromatic aberration arises due to the focal length varying with wavelength.

In transverse chromatic aberration, color components from a single point are brought to focus to different points on the same image plane, resulting in a lateral shift of the image. This has the effect of magnifying the different wavelength differently and can be visually seen as color fringing. Thus, transverse chromatic aberration can be seen as an effect due to magnification varying with wavelength.

Procedures for correcting chromatic aberration suitable for the present embodiments are found, for example, in U.S. Patent Application Publication No. 20090263018 and U.S. Pat. No. 8,358,835 the contents of which are hereby incorporated by reference.

The present inventor found that an improved time matching between the input image and output image can be obtained by reducing the number of output pixel data rows responsively to the level of the distortion, more preferably responsively to the vertical extent of the distortion. Thus, according to some embodiments of the present invention the method continues to 14 at which the output image data are sampled. The sampling is preferably with respect to the rows of the output image data, wherein the horizontal resolution is maintained as in the input image.

Since for a given imaging system setup (optics and imaging sensor), the distortion field does not change over time, many parameters of the correction can be calculated in advance. Specifically, the method can calculate the total number of input lines that are fed in during the output calculation. The method can also determine, a priori, which of the input lines are not processed and not output. The method can additionally determine, the sampling ratio, both in the vertical direction, and, along the horizontal direction (in embodiments in which horizontal sampling is employed).

The additional sampling 14 optionally and preferably employs a sampling factor selected such that the input image data is substantially synchronized (within a predetermined asynchronization error) with the output image data. A typical asynchronization error is less than 20% or less than 10% or less than 5% or less than 1% of the streaming time of the entire image.

As a simplified example, suppose that the maximal distortion (e.g., at the topmost row of the input image) is such that the information for a single row spans over $\Delta$ rows of the input image data. When such distortion is corrected, the resulting delay between the input and output is of approximately $\Delta$ rows of data. The sampling factor of 14 can be set to $L/(L-\Delta)$ such as to compensate for this delay.

Figure 5:
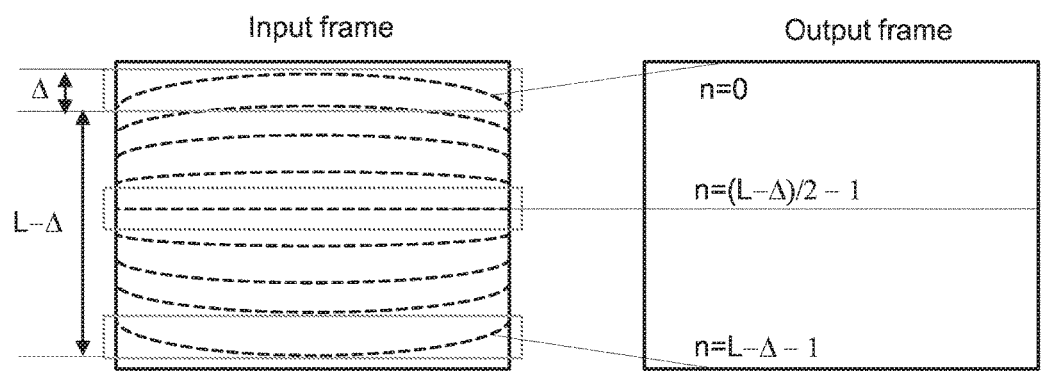
FIG. 5 is a schematic illustration describing a sampling procedure which can be applied to output image data according to some embodiments of the present invention.

The sampling 14 can generally be expressed as a function $y(n)$ that returns the vertical coordinates of pixel data rows that are sampled from the output image. In various exemplary embodiments of the invention $y(n)$ increases linearly with n, e.g., $y(n)$ can be written as $y(n)=n\times C$ where C is a sampling factor that is optionally and preferably selected based on the vertical extent of the distortion. Preferably, C is selected based on the maximal extent $\Delta$ (see FIG. 1). In some embodiments of the present invention C is greater than 1. A representative example of a sampling procedure for the nth row of the output image data is $y(n)=n\times L/(L-\Delta)$. A schematic illustration of this example is shown in FIG. 5.

The method optionally and preferably continues to 15 at which the corrected and optionally further sampled image data are transmitted to a display and/or a computer readable medium.

The method ends at 16.

Figure 6:
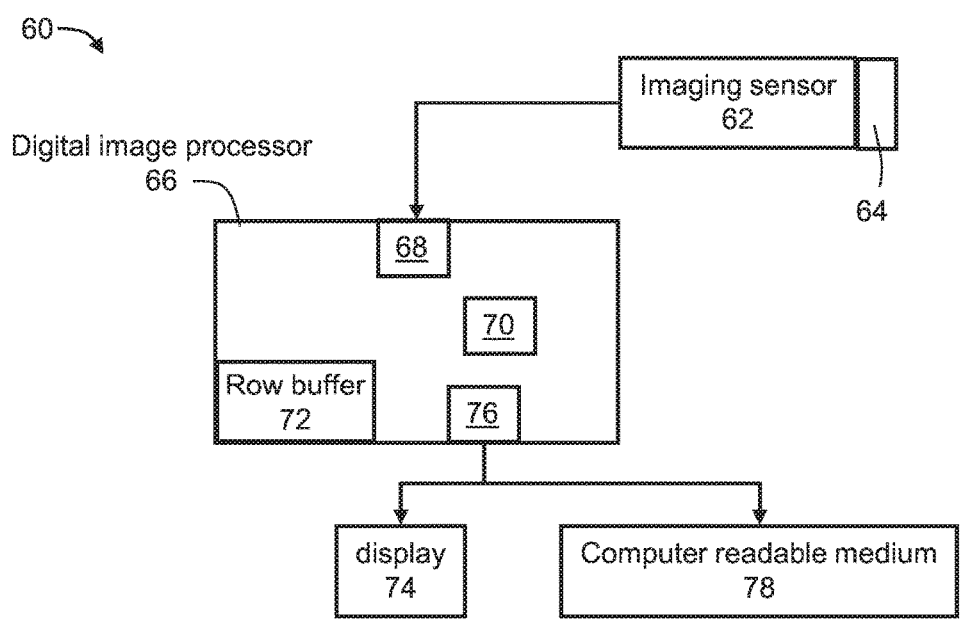
FIG. 6 is a schematic illustration of a system for image processing, according to some embodiments of the present invention.

FIG. 6 is a schematic illustration of a system 60 for image processing, according to some embodiments of the present invention. System 60 optionally comprises an imaging sensor 62 configured for capturing an image of a scene. Sensor 62 can comprise a pixelated imager of any type, including, without limitation, a CMOS or CCD matrix. Sensor 62 can be configured for capturing images in the visible and or infrared domain. For example, imaging sensor 62 comprise a pixelated imager which is devoid of IR CUT filter and which therefore generates a signal in response to light at any wavelength within the visible range and any wavelength within the IR range, more preferably the near IR range.

Representative examples of a characteristic wavelength range detectable by the imaging sensors include, without limitation, any wavelength from about 400 nm to about 1100 nm, or any wavelength from about 400 nm to about 1000 nm. In some embodiments of the present invention the imaging devices also provide signal responsively to light at the ultraviolet (UV) range. In these embodiments, the characteristic wavelength range detectable by the imaging devices can be from about 300 nm to about 1100 nm. Other characteristic wavelength ranges are not excluded from the scope of the present invention.

In various exemplary embodiments of the invention sensor 62 comprises optics 64 designed and constituted to focus incoming light on the pixel array of the sensor. Optics 64 typically includes one or more lenses that introduce distortion into the acquired image. The characteristic vertical extent of the distortion is denoted by the parameter M, as further detailed hereinabove.

System 60 further comprises a digital image processor 66 configured to receive input image data from imaging sensor 62. The received image data is arranged in a plurality of pixel data rows as further detailed hereinabove. Data can be received via an input circuit 68. Digital image processor 66 samples the input image data to provide sampled image data having less pixel data rows than the input image. The sampling can be by a sampling circuit 70 configured for performing the sampling as further detailed hereinabove. System 60 also comprises a row buffer 72 configured to temporarily store partial image data corresponding to a portion of the pixel data rows of the sampled image, as further detailed hereinabove. Row buffer 72 can be provided as a separate memory medium or it can reside in the internal memory of processor 66. Buffer 72 is optionally and preferably configured to temporarily store K rows, where K satisfies the constraint $2^{i-1}$ K<M<$2^i$ K, and where i is a positive integer (e.g., 1, 2, 3, 4 or 5).

Digital image processor 66 receives the partial image data from buffer 72 and corrects image distortion in the partial image data, as further detailed hereinabove. In some embodiments of the present invention, processor 66 also samples the output image data as further detailed hereinabove. Processor 66 transmits the corrected and optionally further samples image data to a display 74 and/or a computer readable medium 78. The transmission can be via an output circuit 76, which can be configured for wireless or wired transmission. For example, processor 66 can transmits the image data over a communication network to a display or computer readable medium at a remote location. When display 74 is local with respect to processor 66 (e.g., what both the display and the processor are at the same facility or the same room), it can connect to processor 66 using an appropriate connection mechanism, for example and without limitation, HDMI, DisplayPort, composite video, component video, S-Video, DVI, or VGA.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An image processing method, comprising:
receiving from an imaging sensor input image data arranged in a plurality of pixel data rows corresponding to a grid of sensor pixels;
using a digital image processor for sampling said input image data to provide sampled image data having less pixel data rows than said plurality of pixel data rows;
using said digital image processor for correcting image distortion in at least a portion of said sampled data to provide processed image data, said correcting comprising collectively processing pixel data rows sampled from M consecutive pixel data rows of said input image data and stored in a row buffer having a storage capacity of no more than K pixel data rows, wherein M is between $2^{i-1}K$ and $2^{i}K$, and wherein i is a positive integer; and
transmitting said processed image data to a display and/or a computer readable medium.

2. The method according to claim 1, wherein said image data are sampled such that a resolution along each pixel data row is maintained.

3. The method according to claim 1, wherein said correction of said image distortion is executed to correct a geometric distortion.

4. The method according to claim 2, wherein said correction of said image distortion is executed to correct a geometric distortion.

5. The method according to claim 3, wherein said geometric distortion comprises pincushion distortion.

6. The method according to claim 3, wherein said geometric distortion comprises barrel distortion.

7. The method according to claim 5, wherein said geometric distortion comprises barrel distortion.

8. The method according to claim 1, wherein said correction of said image distortion is executed to correct a chromatic aberration.

9. The method according to claim 8, wherein said chromatic aberration comprises a longitudinal chromatic aberration.

10. The method according to claim 8, wherein said chromatic aberration comprises a lateral chromatic aberration.

11. The method according to claim 1, wherein said correction of said image distortion is effected by a metric procedure.

12. The method according to claim 1, wherein said correction of said image distortion is effected by a non-metric procedure.

13. The method according to claim 1, further comprising sampling said processed image data prior to said transmission.

14. The method according to claim 13, wherein a sampling factor characterizing said sampling of said processed image data is selected responsively to a level of said distortion.

15. The method according to claim 1, wherein said image data correspond to a frame of a video stream, and the method is repeated for each frame of said video stream.

16. A computer software product, comprising a non-transitory computer-readable medium in which program instructions are stored, which instructions, when read by a computer, cause the computer to receive from an imaging sensor input image data arranged in a plurality of pixel data rows corresponding to a grid of sensor pixels, and to execute the method according to claim 1.

17. A system for image processing, comprising:
a digital image processor configured to receive from an imaging sensor input image data arranged in a plurality of pixel data rows corresponding to a grid of sensor pixels, and to sample said input image data to provide sampled image data having less pixel data rows than said plurality of pixel data rows; and a row buffer configured to temporarily store partial image data corresponding to a portion of said less pixel data rows;

wherein said digital image processor is configured to receive said partial image data from said buffer and to correct image distortion in said partial image data, wherein said row buffer has a storage capacity of no more than K pixel data rows, wherein said processor is configured to sample pixel data rows from M consecutive pixel data rows of said input image data, and wherein M is between $2^{i-1}K$ and $2^{i}K$.

18. The system of claim 17, further comprising said imaging sensor.

19. The system according to claim 17, wherein said processor is configured to sample said image data such that a resolution along each pixel data row is maintained.

20. The system according to claim 17, wherein said processor is configured to correct a geometric distortion in said partial image data.

21. The system according to claim 20, wherein said geometric distortion comprises pincushion distortion.

22. The system according to claim 20, wherein said geometric distortion comprises barrel distortion.

23. The system according to claim 21, wherein said geometric distortion comprises barrel distortion.

24. The system according to claim 17, wherein said processor is configured to correct a chromatic aberration in said partial image data.

25. The system according to claim 20, wherein said processor is configured to correct a chromatic aberration in said partial image data.

26. The system according to claim 24, wherein said chromatic aberration comprises a longitudinal chromatic aberration.

27. The system according to claim 24, wherein said chromatic aberration comprises a lateral chromatic aberration.

28. The system according to claim 25, wherein said chromatic aberration comprises a longitudinal chromatic aberration.

29. The system according to claim 25, wherein said chromatic aberration comprises a lateral chromatic aberration.

30. The system according to claim 17, wherein said correction of said image distortion is effected by a metric procedure.

31. The system according to claim 17, wherein said correction of said image distortion is effected by a non-metric procedure.

32. The system according to claim 17, wherein said processor is configured to sample image data following said correction.

33. The system according to claim 32, wherein a sampling factor characterizing said sampling of said image data following said correction is selected responsively to a level of said distortion.

* * * * *